Patented Jan. 24, 1950

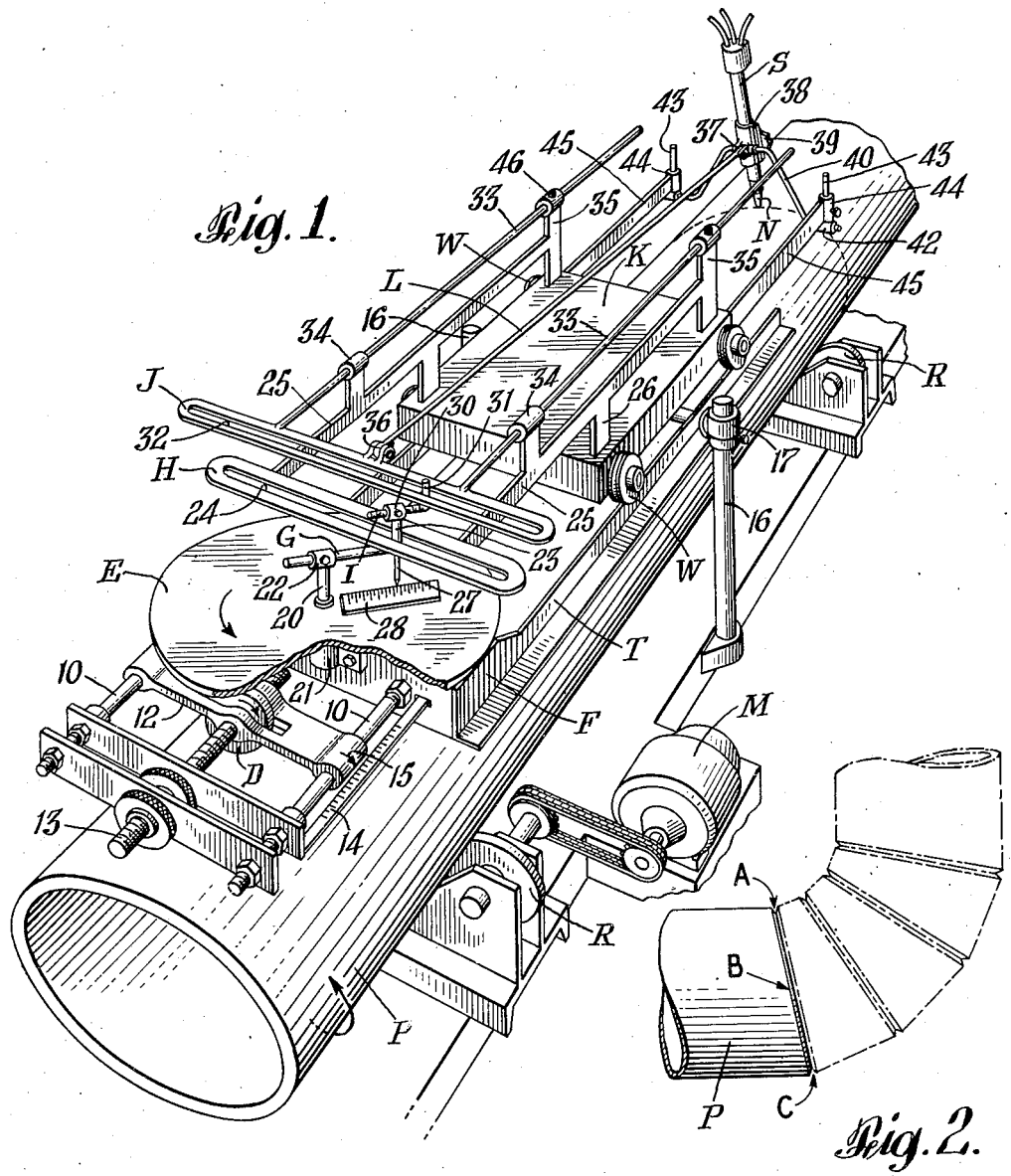
Fig. 1.
Fig. 2.
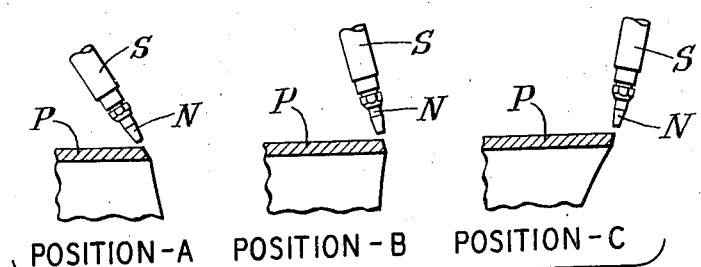
POSITION-A   POSITION-B   POSITION-C
Fig. 3.
INVENTOR
LLOYD W. YOUNG
BY
ATTORNEY

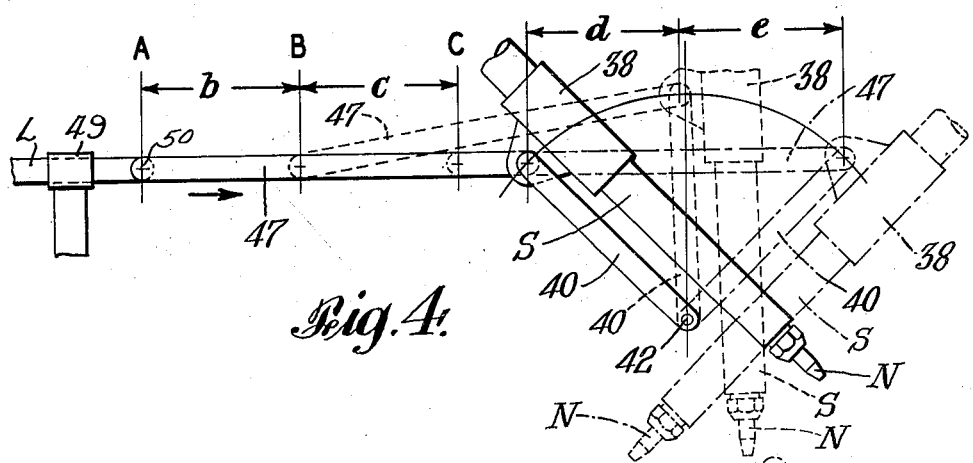
*Fig. 4.*
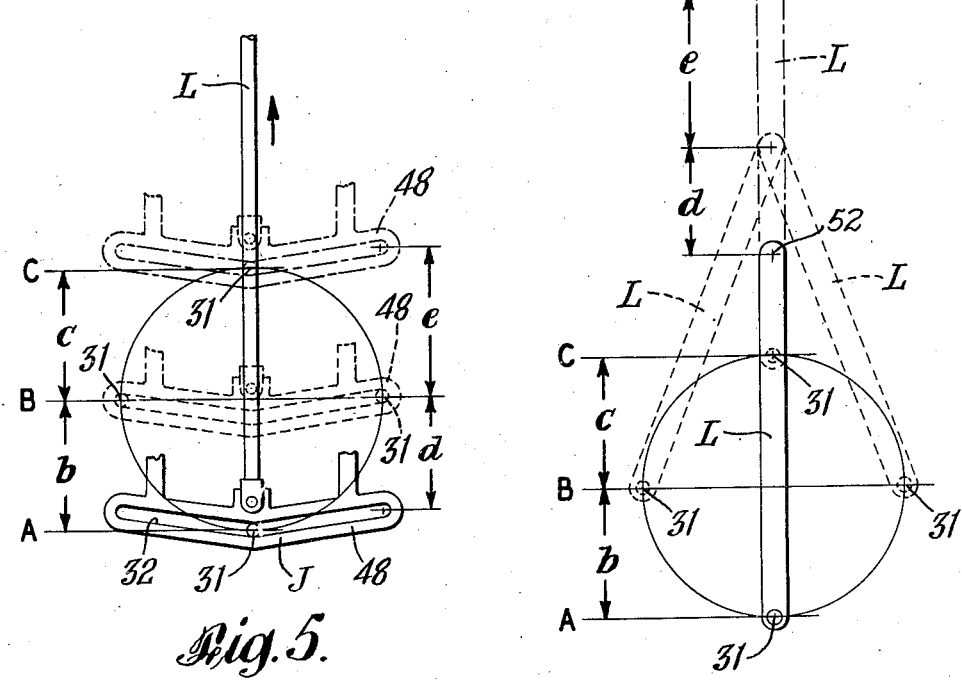
*Fig. 5.*
*Fig. 6.*

2,495,360

UNITED STATES PATENT OFFICE 2,495,360

PIPE MITERING MACHINE

Lloyd W. Young, Elizabeth, N. J., assignor to The Linde Air Products Company, a corporation of Ohio Application November 23, 1945, Serial No. 630,442

14 Claims. (Cl. 266—23)

This invention relates to pipe mitering machines, and more particularly to a blowpipe machine provided with automatic means for continuously varying the position of the cutting blowpipe during relative rotation of the pipe being cut. This variation of position may be only in the direction longitudinally of the pipe for a miter cut, or it may comprise continuously varying the angle of the cutting blowpipe in a longitudinal axial plane with respect to the pipe being cut, in order to produce a mitered and beveled pipe end correctly prepared for welding.

In forming an elbow by welding mitered ends of pipe together, various pipe sections are required depending upon the uniformity of flow desired through the elbow. With the same angle of bend, for example 90°, an elbow formed of two mitered sections having only one weld will offer some resistance to flow, whereas if the elbow is formed of several mitered sections welded together at their edges to complete the bend, the restriction to the flow of fluid around the bend is greatly reduced. Such elbows or bends made up of several welded mitered sections require extreme accuracy in preparation. Furthermore, in order to provide a uniform groove for welding around the entire circumference of the pipe, the angle of bevel for the cutting blowpipe with respect to the surface of the pipe must be made to vary continuously throughout the cut.

It is therefore the main object of this invention to provide mechanism for gradually changing the inclination of a blowpipe nozzle in a longitudinal plane containing the axis of the pipe during relative rotation of the pipe and the blowpipe nozzle about the pipe axis while cutting the pipe.

Pipe mitering and beveling machines heretofore proposed have been complex in construction and adjustment, not usually portable, and have been costly. For these reasons a large part of mitered and beveled pipe ends have been flame cut by hand.

It is therefore a further object of the present invention to provide a portable machine of this character, which is simple in construction, easy to adjust and accurate in operation.

Another object of this invention is to provide an improved machine for automatically beveling pipe wherein various sizes of pipe, mitered ends and bevel angles can be cut with a minimum of adjustments.

The above and other objects as well as novel features of this invention will be apparent from the following description taken with the accompanying drawings, in which:

Fig. 1 is a detailed perspective view of a preferred embodiment of the present invention;

Fig. 2 is a diagram of the mitered sections of pipe to be welded to form an elbow.

Fig. 3 is a schematic diagram showing three differently inclined positions of a cutting blowpipe nozzle at points around a mitered end edge of a pipe; and Figs. 4, 5, and 6 are diagrams of modifications.

As shown in Fig. 1, the pipe P is supported upon pairs of rollers R, one roller of which may be rotated by a motor M for causing rotation of the pipe P about its longitudinal axis. A frame F is mounted above the pipe and supports a pair of tracks T which extend longitudinally of the pipe. A carriage K is provided with wheels W rolling on the track T. A blowpipe S is pivoted on the carriage K for swinging in a longitudinal plane containing the axis of the pipe, to vary the inclination of the blowpipe nozzle N as the pipe is severed, to produce a mitered and beveled end edge.

A traction drive roller D is journaled in the frame F on a longitudinal axis so as to ride on the outside of the pipe in rolling engagement therewith. The traction drive roller D is in rolling engagement with the underside of a disc E journaled in the frame F on an axis radial to the pipe. Rigid with the disc E is a crank G which engages a slotted Scotch yoke H rigid with the carriage K for moving the same along the track T. A second crank I is mounted on the first crank G and engages a second Scotch yoke J which is longitudinally slidable on the carriage K, and is pivoted to a connecting rod L in turn pivoted to the holder of the blowpipe S.

As the pipe is rotated by the roller R driven by the motor M, the traction drive roller D is rotated by the pipe, and drives the disc E which turns the crank G, which through the Scotch yoke H moves the carriage K and thereby moves the blowpipe S longitudinally to effect the miter cut. At the same time, the second crank I turns with the crank G, and through the second Scotch yoke J and connecting rod L moves the blowpipe S about its pivot to gradually change the inclination of its nozzle N in a longitudinal plane and effect the swinging bevel of the pipe edge.

The frame F comprises a pair of parallel guide rods 10 on which is slidably mounted a bridge member 12, which is longitudinally positioned by means of an adjusting screw 13. The traction drive roller D is preferably constructed of resilient material with a friction surface and is journaled on the screw 13 within the bridge 12. The drive roll D is positioned with respect to the axis of the disc E in accordance with the diameter of the pipe being cut, so that the rotation of the disc E with respect to the rotation of the pipe P is a one to one ratio. A scale 14 on the frame F cooperates with a pointer 15 on the bridge 12 to facilitate this adjustment, and may be calibrated direct in pipe diameters.

The frame F is pivotally mounted on two vertical posts 16 by means of vertically adjustable clamping sleeves 17, which permit adjustment to different diameters of pipe, with sufficient clearance to cause the weight of the frame to bear on the traction drive roller D and provide sufficient traction to prevent slippage.

The disc E has a spindle 20 journaled in a bearing 21 secured to the frame F below the disc. The spindle 20 also extends above the disc and is provided with a clamping sleeve 22 in which the arm of crank G is slidably adjusted. The crank G has a crank pin 23 which rides in the slot 24 of the Scotch yoke H, which is rigid with the carriage K, preferably attached to the ends of parallel bars 25 having legs 26 secured to the carriage.

The crank G has a depending pointer 27, which cooperates with a scale 28 on the disc E. This scale is calibrated directly in mitered angles for respective pipe sizes.

The crank pin 23 has at its upper end a clamping sleeve 30 parallel to the arm of crank G, and in which is slidably adjustably mounted the arm of the second crank I. The second crank I has a crank pin 31 which rides in the slot 32 of the Scotch yoke J, which is carried by guide rods 33 slidable in sleeve bearings 34 mounted on the carriage K, preferably in arms 35 extending upward from the bars 25. The arm of crank I is provided with a scale calibrated directly in degrees of angle of bevel.

The connecting rod L is pivotally connected at one end to the yoke J as at 36, and the other end thereof is pivotally connected as at 37 to the holder 38 for the blowpipe S, in which the blowpipe is longitudinally adjustable by means of a handwheel 39. The blowpipe holder 38 is mounted in a cradle comprising an inverted V-shaped member 40, pivoted as at 42 to the ends of stems 43 vertically adjustable in sleeves 44 mounted at the ends of parallel bars 45 rigidly secured to the carriage K and extending therefrom longitudinally of the pipe. The sleeves 44 permit adjustment to pivot the blowpipe about a point which is in alignment with the inside wall of the pipe.

Apparatus embodying this invention is particularly useful in accurately mitering, or both mitering and beveling several pipe sections needed to form an elbow. The mitered and beveled end edges of several sections are assembled in appropriate relation to provide circumferential grooves to receive weld metal for uniting the sections end to end, as shown in Fig. 2. As here shown, the point A is on the inside of the bend, the point C is on the outside of the bend, and the point B is at the center or median position. As shown in Fig. 3, position B is the only one in which the blowpipe is inclined at the actual angle of bevel. In position A the angle between the blowpipe and the pipe axis is the remainder of the angle of bevel minus the angle of miter, while in position C the angle between the blowpipe and the pipe axis is the total of the angle of bevel plus the angle of miter. The intermediate positions are gradually changing, in order to have a constant angle of V-groove cross-section formed by the mating edges of adjacent pipe edges for the welding operation.

It should be noted that the beveling mechanism may be locked in fixed position so as to produce only a simple unbeveled miter cut. The crank arm I may be removed and the guide rods 33 clamped in fixed position by adjustable set screws 46 in the opposite guide sleeves 34, to set the blowpipe in fixed position radial to the pipe to produce a miter cut having a square or unbeveled edge.

It is stated hereinbefore that in Fig. 3 position B is the only position in which the blowpipe is inclined at the actual angle of bevel. This is true—the blowpipe is inclined at the actual angle of bevel at position B. However, the blowpipe centerline is also parallel with the axis of the pipe, not normal to the angle of miter. Bevels are always measured normal to the angle of miter. This condition causes an error in the angle of bevel at position B; e. g., when the machine is set up to cut a 45 degree miter and the included angle of bevel is 30 degrees, this included angle will be had only at positions A and C and the actual included angle of bevel at B will be approximately 21½ degrees.

In order to correct this error, the blowpipe must be inclined at an angle greater than that of the angle of bevel at B. This error in angle of bevel at B may be corrected in a number of ways shown in Figs. 4, 5, and 6.

Referring to Fig. 4, the tie rod L is slidably supported by a sleeve bearing 49 and connected to the member 40 by a link 47 pivoted by a pin 50 to the tie rod L, which is shown in three positions corresponding to the three positions A, B, and C on the pipe. Position B is midway between positions A and C, as shown at "b" and "c" while the movement of the blowpipe yoke 40 is less for a given travel at "b" as shown at "d" and greater for a given travel at C as shown at "e."

An alternative arrangement is shown in Fig. 5 wherein compensation is had by making the slot 48 in Scotch yoke J in the form of a V. The angle of this V slot will determine the amount of compensation or increase angle of bevel at B. The three positions of crank pin 31 correspond to positions A, B and C of the pipe. Inclining the slot 32 in Scotch yoke J, either side of center as shown, will decrease the travel of the Scotch yoke J and tie rod L for the first 90 degrees rotation of crank pin 31 from A to B as shown at "d." Rotation of crank pin 31 from 90 to 180 degree (B to C) will increase the travel of the Scotch yoke as shown at "e" and the overall travel of the Scotch yoke will be equal to the total distance traveled by crank pin 31 from A to C.

An alternative arrangement is shown in Fig. 6 wherein compensation is had by pivotally attaching tie rod L directly to pin 31 and providing a universal joint 52 at the forward end of tie rod L to provide movement in two planes. Position B is midway between positions A and C as shown at "b" and "c" while the movement of the blowpipe yoke 40, attached to the universal joint 52 at the forward end of tie rod L, will be less for a given travel at "b" as shown at "d" and greater for a given travel at "c" as shown at "e".

What is claimed is:

1. Apparatus for cutting a varying angle bevel in pipe, comprising means for supporting a blowpipe nozzle and the pipe to be cut for relative rotation about the longitudinal axis of the pipe, means actuated in timed relation to such relative rotation for causing relative longitudinal movement of said nozzle and pipe to cause a miter cut in the pipe, an actuator driven in similarly timed relation, a link driven by said actuator and connected to the blowpipe, and a coupling interposed between said actuator and blowpipe and connected to said link for gradually changing the inclination of said blowpipe nozzle in a longitudinal plane with respect to the pipe during such relative rotation to maintain a constant angle of bevel measured perpendicular to said miter cut.

2. In a pipe mitering machine, means for supporting a blowpipe nozzle and the pipe being cut for relative rotation about the longitudinal axis of the pipe, means for causing relative longitudinal movement of said nozzle and pipe during said relative rotation to cause a miter cut in the pipe, an actuator driven in timed relation to such relative rotation, a link driven by said actuator and connected to the blowpipe, and a coupling interposed between said actuator and blowpipe and connected to said link for gradually changing the inclination of said blowpipe nozzle in a longitudinal plane with respect to the pipe being cut to provide a swinging bevel edge for said miter cut.

3. Apparatus for cutting a varying angle bevel in pipe, comprising means for causing relative rotation of a blowpipe nozzle and the pipe being cut, an actuator rotated in timed relation to said relative rotation of said nozzle and pipe, means responsive to said actuator for causing relative longitudinal movement of said nozzle and pipe during said relative rotation, a link driven by said actuator and connected to the blowpipe, and a coupling interposed between said actuator and blowpipe and connected to said link changing the inclination of said nozzle during said relative rotation and said relative longitudinal movement to maintain a constant angle of bevel measured perpendicular to the cut.

4. Apparatus for cutting a varying angle bevel in pipe, comprising means for causing relative rotation of a blowpipe nozzle and the pipe being cut, an actuator rotated in timed relation to said relative rotation of said nozzle and pipe, means responsive to said actuator for causing relative longitudinal movement of said nozzle and pipe during said relative rotation, and a Scotch yoke having a chevron slot engaged by said actuator for gradually changing the inclination of said nozzle during said relative rotation and relative longitudinal movement.

5. Apparatus for cutting a varying angle bevel in pipe, comprising a carriage movable longitudinally of said pipe, a blowpipe pivoted on said carriage for swinging movement in a longitudinal plane with respect to said pipe, means for rotating said pipe, means for moving said carriage longitudinally of said pipe to cause said blowpipe to make a miter cut in the pipe, and mechanism for tilting said blowpipe about its pivot during the rotation of said pipe, said tilting mechanism comprising a rod connected to said carriage and a link interposed between said rod and said blowpipe to maintain a constant angle of bevel measured perpendicular to said miter cut.

6. In a pipe mitering and beveling machine, means for supporting a pipe to be cut for rotation about the longitudinal axis of the pipe, means for supporting a blowpipe for pivotal movement in a plane extending longitudinally with respect to said pipe, a traction roller in rolling engagement with said pipe, a disc in rolling engagement with said traction roller, and means actuated by said disc for swinging said blowpipe in said plane comprising a link eccentrically pivoted on said disc and connected to the blowpipe by a universal joint for gradually changing the inclination of said blowpipe with respect to the longitudinal axis of the pipe, to maintain the inclination of said blowpipe constant measured perpendicular to the miter cut.

7. In a pipe mitering machine, means for supporting a pipe to be cut for rotation about the longitudinal axis of the pipe, a frame pivoted intermediate its ends on an axis transverse to the longitudinal axis of the pipe, rails on said frame substantially parallel to the longitudinal axis of the pipe, a carriage rolling on said rails, a blowpipe supported at one end of said carriage, and means actuated in timed relation to such rotation of the pipe for moving said carriage along said rails for moving said blowpipe longitudinally of the pipe as the pipe rotates to cause a miter cut in the pipe.

8. In a pipe mitering machine, means for supporting a pipe to be cut for rotation about the longitudinal axis of the pipe, means for supporting a blowpipe for longitudinal movement with respect to the pipe, a rolling contact member in traction engagement with the periphery of the pipe, means actuated by said rolling contact member for causing such longitudinal movement of the blowpipe during rotation of the pipe to cause a miter cut in the pipe an actuator driven by said rolling contact member, a link driven by said actuator and connected to the blowpipe, and a coupling interposed between said actuator and blowpipe and connected to said link for maintaining a constant angle of bevel perpendicular to said miter cut.

9. In a pipe mitering machine, pairs of rolls for supporting the pipe to be cut for rotation about the longitudinal axis of the pipe, means for supporting a blowpipe for longitudinal movement with respect to the pipe, means actuated in timed relation to such rotation for causing relative longitudinal movement of said nozzle and pipe during such rotation to cause a miter cut in the pipe, an actuator driven in timed relation to such relative rotation, a link driven by said actuator and connected to the blowpipe, and a coupling interposed between said actuator and blowpipe and connected to said link for maintaining a constant angle of bevel perpendicular to said miter cut said blowpipe supporting and actuating means being adjustably mounted with respect to said pairs of rolls, whereby a pipe of any length can be positioned upon said rolls, after which said blowpipe supporting and actuating means may be set in position to cut the pipe.

10. In a pipe mitering machine, means for supporting the pipe to be cut for rotation about the longitudinal axis of the pipe, a frame mounted for movement toward and away from said pipe, means on said frame for supporting a blowpipe for longitudinal movement with respect to the pipe, a rolling contact member journaled in said frame and adapted to tractionally engage the periphery of the pipe when said frame is moved toward the pipe, means actuated by said rolling contact member for causing said longitudinal movement of said blowpipe as the pipe rotates to cause a miter cut in the pipe an actuator driven in timed relation to such relative rotation, a link driven by said actuator and connected to the blowpipe, and a coupling interposed between said actuator and blowpipe and connected to said link for maintaining a constant angle of bevel perpendicular to said miter cut.

11. In a pipe mitering and beveling machine, means for supporting a blowpipe for pivotal movement in a plane extending longitudinally of the pipe, means for causing relative rotation of said blowpipe supporting means and the pipe, means for reciprocating said blowpipe supporting means to cause a miter cut in the pipe, a reciprocating member for tilting the blowpipe to cut a bevel on the miter, and a compensating link interposed between said reciprocating member and said blowpipe to maintain a constant angle of bevel measured perpendicular to the miter cut.

12. In a pipe mitering and beveling machine, means for supporting a blowpipe for pivotal movement in a plane extending longitudinally of the pipe, means for causing relative rotation of said blowpipe supporting means and the pipe, means for reciprocating said blowpipe supporting means to cause a miter cut in the pipe, a reciprocating member having a universal joint to the blowpipe for tilting the blowpipe to cut a bevel on the miter, and a rotary member for driving said reciprocating member to maintain a constant angle of bevel measured perpendicular to the miter cut.

13. In a pipe mitering machine, means for causing relative rotation of a blowpipe nozzle and the pipe being cut about the longitudinal axis of the pipe, means for causing relative longitudinal movement of said nozzle and pipe during such relative rotation in timed relation thereto to cause a miter cut in the pipe, an actuator driven in timed relation thereto, a link driven by said actuator and connected to the blowpipe, and a coupling interposed between said actuator and said nozzle and connected to said link for gradually changing the inclination of the blowpipe to provide a bevel edge for the miter cut.

14. Apparatus for cutting a varying angle bevel in pipe, comprising means for mounting a blowpipe nozzle for swinging movement about an axis substantially tangent to the pipe, means for causing relative rotation of said nozzle and the pipe about the longitudinal axis thereof, means for causing relative longitudinal movement of said nozzle and pipe during such relative rotation to cause a miter cut in the pipe, an actuator driven in timed relation to said relative rotation, a link driven by said actuator and connected to the blowpipe for causing inclination thereof during said relative rotation to cause a miter cut in the pipe, and a coupling interposed between said actuator and said nozzle and connected to said link for gradually changing the blowpipe inclination to provide a bevel edge for said miter cut.

LLOYD W. YOUNG.

REFERENCES CITED

The following references are of record in the file of this patent:

UNITED STATES PATENTS

| Number | Name | Date |
|---|---|---|
| 1,661,274 | Steere et al. | Mar. 6, 1928 |
| 1,858,076 | Douglass | May 10, 1932 |
| 1,858,078 | Douglass et al. | May 10, 1932 |
| 1,928,121 | Anderson | Sep. 26, 1933 |
| 1,954,549 | Twigg et al. | Apr. 10, 1934 |
| 1,963,537 | Tweit | June 19, 1934 |
| 2,035,765 | Schmidt | Mar. 31, 1936 |
| 2,384,128 | Nation | Sept. 4, 1945 |

FOREIGN PATENTS

| Number | Country | Date |
|---|---|---|
| 135,962 | Austria | Dec. 27, 1933 |